US009847797B2

(12) United States Patent
Knight et al.

(10) Patent No.: US 9,847,797 B2
(45) Date of Patent: Dec. 19, 2017

(54) WIRELESS CONTROLLERS

(75) Inventors: Steven J. Knight, Mission Hill, SD (US); Timothy Jack Gilmore, Yankton, SD (US); Wade Anthony Dangler, Yankton, SD (US)

(73) Assignee: Shur-Co, LLC, Yankton, SD (US)

(*) Notice: Subject to any disclaimer, the term of this patent is extended or adjusted under 35 U.S.C. 154(b) by 253 days.

(21) Appl. No.: 13/032,169

(22) Filed: Feb. 22, 2011

(65) Prior Publication Data
US 2011/0203865 A1 Aug. 25, 2011

Related U.S. Application Data

(60) Provisional application No. 61/306,634, filed on Feb. 22, 2010.

(51) Int. Cl.
*H04B 1/034* (2006.01)
*B60J 7/057* (2006.01)
*B60P 1/44* (2006.01)

(52) U.S. Cl.
CPC ............ *H04B 1/034* (2013.01); *B60J 7/0573* (2013.01); *B60P 1/4471* (2013.01)

(58) Field of Classification Search
CPC . B60J 11/00; B60J 11/02; B60J 11/025; B60J 11/06; B60P 7/02; B60P 7/04; H04B 1/02; H04B 1/03; H04B 1/0346
USPC ............... 701/2, 36; 340/5.54, 540, 815.45; 341/176
See application file for complete search history.

(56) References Cited

U.S. PATENT DOCUMENTS

| 5,359,942 | A  | * | 11/1994 | Ward ..................... B61D 7/30 105/240 |
| 5,657,700 | A  | * | 8/1997  | Bounds ................... B61D 7/30 104/2 |
| 7,025,361 | B1 | * | 4/2006  | Erickson ................ B60S 9/02 280/6.153 |
| 7,248,150 | B2 | * | 7/2007  | Mackjust et al. ........ 340/426.13 |
| 7,394,367 | B1 | * | 7/2008  | Aupperle et al. ............. 340/540 |
| 2004/0075542 | A1 | * | 4/2004 | Glasscock .......... G07C 9/00944 340/426.36 |
| 2005/0073141 | A1 | * | 4/2005 | Baird ..................... B60P 1/56 280/766.1 |

(Continued)

OTHER PUBLICATIONS

Timpte, http://www.timpte.com/cmsdocuments/HopperMan13_06012013_update.pdf, 2008, p. 1-70.*

(Continued)

*Primary Examiner* — Aaron L Troost
(74) *Attorney, Agent, or Firm* — Jeffrey A. Proehl; Woods, Fuller, Shultz & Smith, P.C

(57) ABSTRACT

A wireless controller for operably controlling at least two devices. The wireless controller includes a cover portion, a base portion, a transmission mechanism and a component activation mechanism. The base portion is operably attached to the cover portion. The transmission mechanism and the component activation mechanism are each mounted to at least one of the cover portion and the base portion. The component activation mechanism causes the transmission mechanism to transmit a communication signal to the at least one of the at least two devices. When the cover portion and the base portion are in a closed configuration, the component activation mechanism is substantially covered.

2 Claims, 4 Drawing Sheets

(56) References Cited

U.S. PATENT DOCUMENTS

| | | | |
|---|---|---|---|
| 2006/0173586 A1* | 8/2006 | Swanson | 701/1 |
| 2008/0055265 A1* | 3/2008 | Bewley | G06F 3/04886 345/173 |
| 2008/0136660 A1* | 6/2008 | Bailey | 340/815.45 |
| 2008/0295030 A1* | 11/2008 | Laberge | G05D 23/1931 715/831 |
| 2009/0212905 A1* | 8/2009 | Batz | B60G 17/017 340/5.54 |
| 2009/0302994 A1 | 12/2009 | Rhee et al. | |
| 2009/0309779 A1* | 12/2009 | Buckbee et al. | 341/176 |

OTHER PUBLICATIONS

Control Chief Summit Series Hand Remote www.controlchief.com/Crane-and-Industrial/Summit-Seres.aspx.

Control Chief Raymote Infrared Industrial Remote Control www.controlchief.com/Crane-and-Industrial/Raymore.aspx.

Control Chief Crane Remote Control Transmitters www.controlchief.com/Crane-and-Industrial/L-Series.aspx.

Roll-Rite Remote Control 6-Button Wireless Keyfob for black box and Remote Control Key-fob Programming, www.rollrite.com/files/hkkl02h6src85c4cs85116rn7nr5zj77.pdf.

\* cited by examiner

WIRELESS CONTROLLERS

REFERENCE TO RELATED APPLICATION

This application claims priority to U.S. Applic. No. 61/306,634, which was filed on Feb. 22, 2010, the contents of which are incorporated herein by reference.

FIELD OF THE INVENTION

The invention relates generally to wireless controllers. More particularly, the invention relates to wireless controllers for controlling accessories on vehicles.

BACKGROUND OF THE INVENTION

Vehicles may include accessories that increase the functionality of the vehicle and/or enhance the ability to use the vehicle to perform tasks. Examples of such accessories include motorized tarp systems, hoppers, landing gear and lifts on a truck and/or trailer. These accessories are broadly classified as non-powered and powered accessories.

The non-powered accessories may be operated by hand such as by rotating a handle attached to landing gear. The powered accessories are connected to an electrical source that enables the powered accessories to be operated using a button or switch.

As an alternative to operating the powered accessories with a controller that is directly connected to the accessory or that is connected to the accessory using a wire, wireless controllers have been developed.

One such wireless controller is marketed by Roll Rite, LLC. The Roll Rite wireless controller includes several buttons. Pressing one of the buttons causes the associated powered accessory on the vehicle to be activated or deactivated.

SUMMARY OF THE INVENTION

An embodiment of the invention relates to a wireless controller for operably controlling at least two devices. The wireless controller includes a cover portion, a base portion, a transmission mechanism and a component activation mechanism.

The base portion is operably attached to the cover portion. The transmission mechanism and the component activation mechanism are each mounted to at least one of the cover portion and the base portion.

The component activation mechanism causes the transmission mechanism to transmit a signal to the at least one of the at least two devices. When the cover portion and the base portion are in a closed position, the component activation mechanism is substantially covered.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
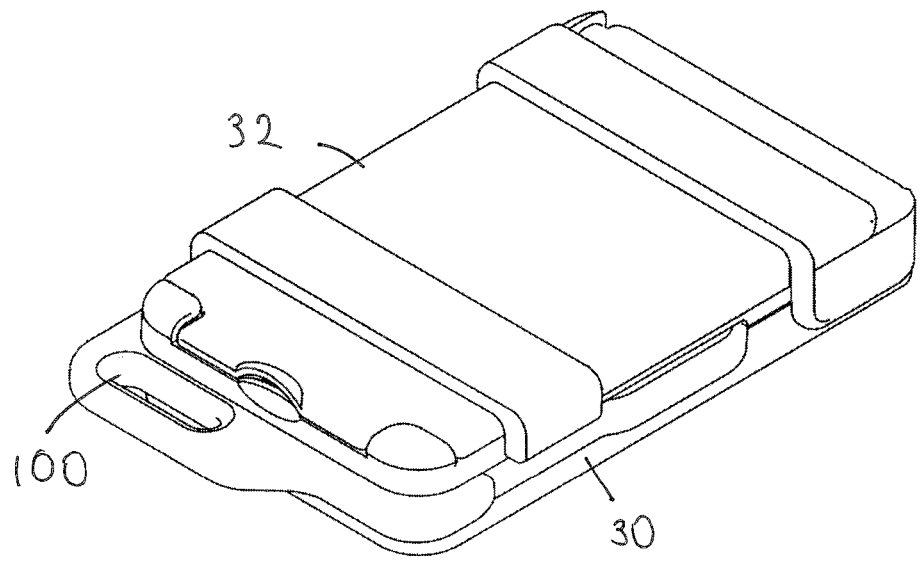
FIG. 1 is a perspective view of a wireless controller according to an embodiment of the invention where the wireless controller is in a closed configuration.
Figure 2:
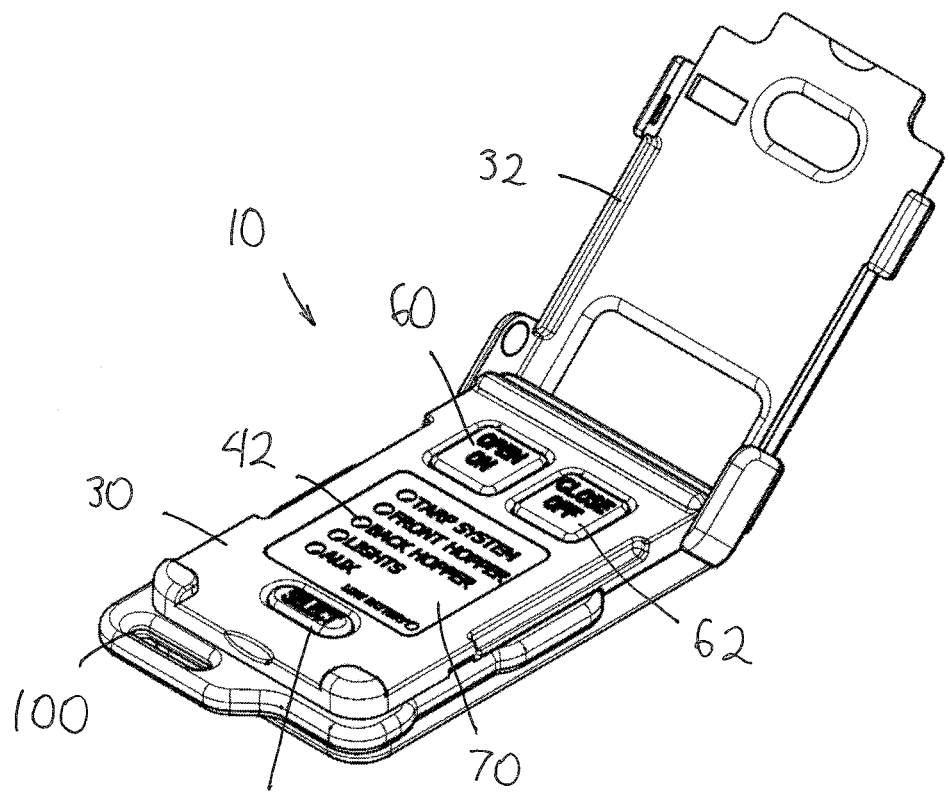
FIG. 2 is a perspective view of the wireless controller in an open configuration.

An embodiment of the invention is directed to a wireless controller, as illustrated at 10 in FIGS. 1-2. One application that the wireless controller 10 is particularly suited is for use in controlling the operation of powered accessories on trucks, trailers, grain carts and/or wagons. Examples of such powered accessories include tarp systems, hoppers, landing gear, lifts and lights.

Figure 3:
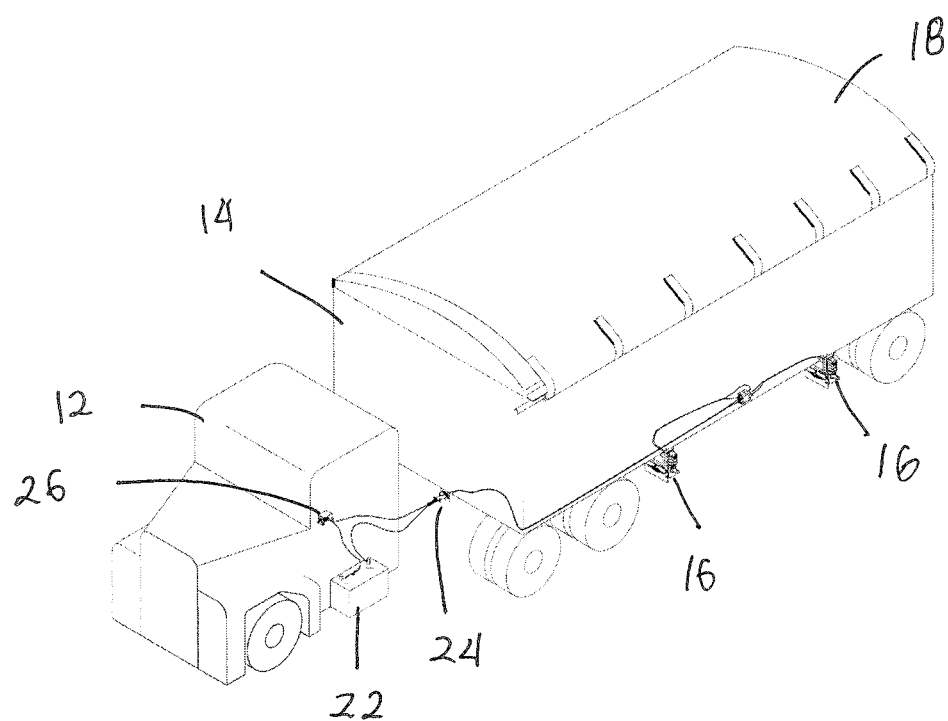
FIG. 3 is a perspective view of a cab and trailer on which the wireless controller may be used.

In one configuration, the wireless controller 10 may be used in conjunction with a truck having a cab 12 and a trailer 14, as illustrated in FIG. 3. The trailer 14 may include at least one hopper door assembly 16 on a lower surface thereof that is capable of being operated with a powered hopper mechanism.

The hopper door assembly 16 is movable between a closed configuration and an open configuration. When the hopper door assembly 16 is in the closed configuration, bulk product such as grain is retained in the trailer 14. When the hopper door assembly 16 is in the open configuration, bulk product such as grain is discharged from the trailer 14.

The trailer 14 may also include a rolling tarp system 18 that is capable of being positioned in an unrolled configuration (illustrated in FIG. 3) where the tarp system substantially covers an upper surface of the trailer 14 to thereby enclose the interior of the trailer 14.

The tarp system 18 may also be rolled to a rolled up configuration (not shown) where a substantial portion of the upper surface of the trailer 14 is not covered. The movement of the tarp system between the unrolled configuration and the rolled configuration may be accomplished using a powered tarp mechanism such as is sold by the assignee of the present application under the designation 3500 series electric.

The components of the powered hopper mechanism and the powered tarp mechanism may be controlled by attachment to a power source. An example of one such power source is a battery 22 that is provided on the cab 12. Alternatively, a separate power source may be provided to power the operation of the powered hopper mechanism 16 and the powered tarp mechanism 20. This separate power source may be mounted on trailer or may be mounted on the ground proximate to where it is desired to use the powered hopper mechanism 16 and the powered tarp mechanism 20.

To facilitate detachment of the cab 12 from the trailer 14, a coupler 24 may be provided between the battery 22 and the powered hopper mechanism and the powered tarp mechanism. A master disconnect switch 26 may also be provided to turn on and off the complete system encompassed by the powered hopper mechanism and the powered tarp mechanism.

An important aspect of the wireless controller 10 is that the wireless controller 10 enables the operation of the desired accessory to be accurately controlled. By accurately controlling the desired accessory, the invention eliminates problems associated with the incorrect accessory being operated. For example, if it is desired to raise the landing gear and the hopper is inadvertently operated, the product stored in the truck, trailer, grain cart and/or wagon may be discharged.

Discharging such product at the wrong location could not only create a mess that must be cleaned up but also could create a hazard to other vehicles proximate to where the product is being discharged. An example of one such situation that could pose a significant hazard is if the product is discharged while the truck, trailer, grain cart and/or wagon is moving along a road.

The wireless controller 10 may also be used in conjunction with stationary objects such as electric gates, grain bin hatches, augers, building curtain systems and fabric doors that may be used in conjunction with trucks, trailers, grain carts and/or wagons.

The wireless controller 10 may generally include a base portion 30 and a cover portion 32. The base portion 30 and the cover portion 32 are movable between a closed configuration (FIG. 1) and an open configuration (FIG. 2).

When the cover portion 32 and the base portion 30 are in the closed configuration, the components of the wireless controller 10 are protected from damage because such components are retained within the wireless controller 10. Examples of the protected components include the buttons and displays that are included in the wireless controller 10.

When the cover portion 32 and the base portion 30 are in the closed configuration, the buttons and displays on the wireless controller 10 are substantially covered. As used herein, the term substantially covered means that more than 50% of the surface area of the buttons and displays are covered. In other configurations, more than 80% of the surface area of the buttons and displays are covered.

Substantially covering the buttons and displays thereby protects the buttons and displays from damage caused by objects contacting the buttons and displays. The closed configuration also reduces the potential of inadvertent activation of the wireless controller 10.

Alternatively or additionally, the power to the components of the wireless controller 10 such as the transmitter may be turned off when the wireless controller 10 is in the closed configuration. Such a process not only reduces the potential of the components associated with the wireless controller 10 from being inadvertently activated but also may increase the battery life.

Figure 4:
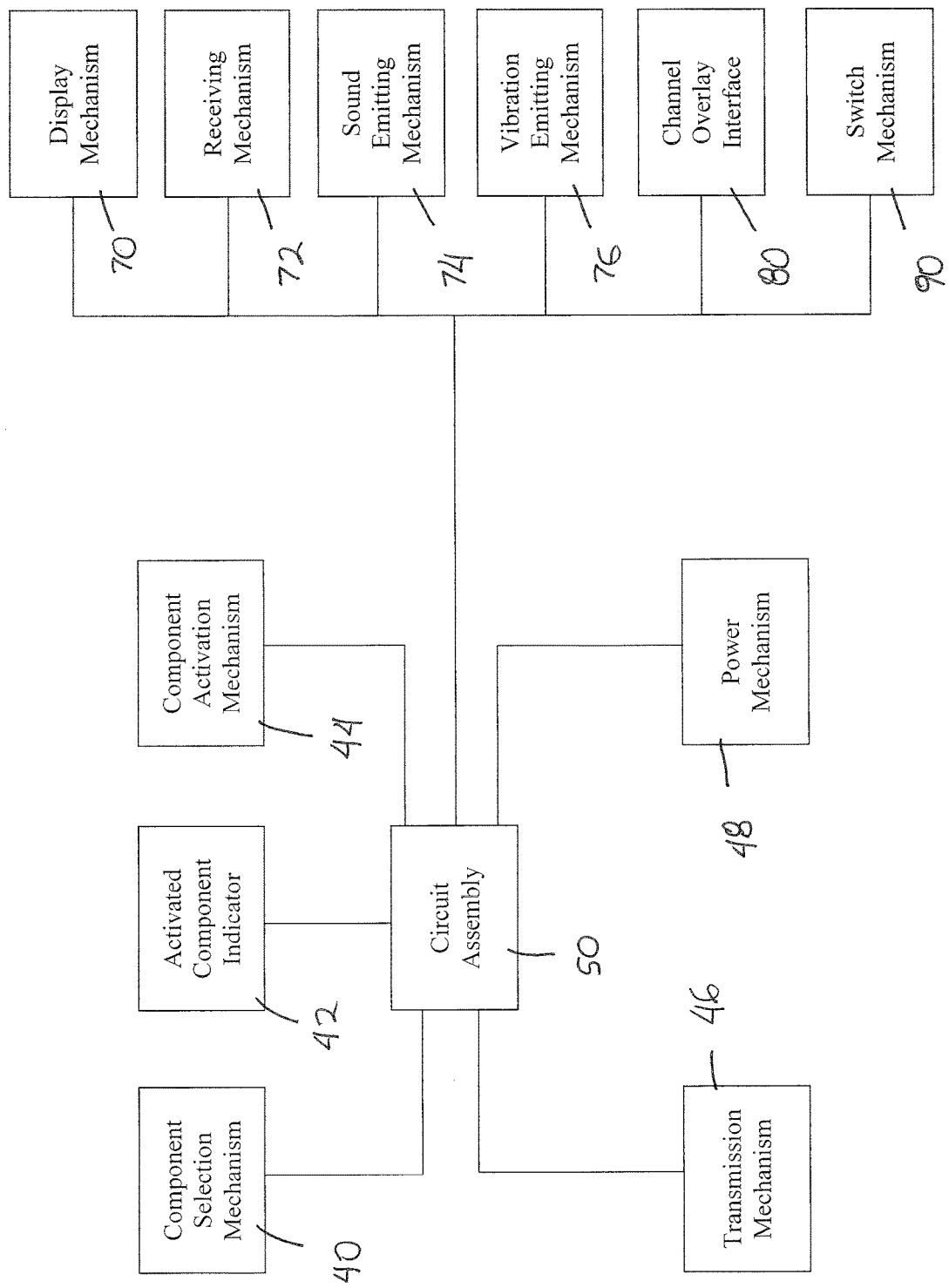
FIG. 4 is a system diagram illustrating interconnection of components within the wireless controller.

The wireless controller 10 may include the following components—a component selection mechanism 40, an activated component indicator 42, a component activation mechanism 44, a transmission mechanism 46, a power mechanism 48 and a circuit assembly 50, as is illustrated in FIG. 4.

The component selection mechanism 40 enables the wireless controller 10 to be used to control multiple accessories without the wireless controller 10 including a component activation mechanism for each of the accessories. The component selection mechanism 40 thereby reduces the complexity of the wireless controller 10 by reducing the number of buttons or similar structures that must be placed on the wireless controller 10.

In one such configuration, the component selection mechanism 40 is a button positioned on the wireless controller 10. The component selection mechanism 40 may be configured so that each time the button is pressed, a different accessory associated with the wireless controller 10 is activated.

In another configuration, the button may be pressed in succession for the number of times that correspond to the number of the component that is desired to be activated. For example, pressing the button 4 times activates the fourth component.

In situations where it is only desired to control a relatively small number of accessories with the wireless controller 10, it is possible for the component selection mechanism 40 to be omitted from the wireless controller 10. An example of situations where the component selection mechanism 40 may be omitted from the wireless controller 10 is when the wireless controller 10 is used in conjunction with controlling the operation of one or two accessories.

The activated component indicator 42 indicates which of the accessories associated with the wireless controller 10 is currently active. In one such configuration, the activated component indicator 42 may include a light that is positioned adjacent to text and/or illustration that identifies the accessory that is being controlled.

In certain embodiments, the light may be a light emitting diode. Using such a configuration enables a person operating the wireless controller 10 to appreciate the significance of the light emitting diode being illuminated. For example, the text "TARP SYSTEM" may be oriented adjacent to one of the light emitting diodes.

In another configuration, the activated component indicator 42 may include illuminating text and/or illustration that identify the accessory that is being controlled. Alternatively or additionally, a graphic representation of a trailer may be provided and the activated component indicator 42 may be placed adjacent to a region of the trailer where the tarp system would be located.

The component activation mechanism 44 may include at least one button 60 that is depressed to cause a signal to be transmitted to the accessory that is being controlled. In one configuration, the component activation mechanism 44 includes a single button. While the single button is depressed, the signal continues to be sent such as to move the hopper door from the closed configuration to the open configuration or to turn on lights. When the single button is not depressed, the signal is not sent, which causes movement of the hopper door to stop.

The single button could also have a design whereby the single button is retained in the depressed position and then pressing the single button a second time can cause the button to return to the initial off position. Such a configuration would be similar to the manner in which a retractable pen operates. This function may also be implemented using a latching circuit and/or latching software.

In other embodiments, the component activation mechanism 44 may include two buttons 60, 62, such as is illustrated in FIG. 2. The first button 60 may be used to open or turn on the accessory. The second button 62 may be used to close or turn off the accessory. A person of skill in the art will appreciate that pressing the first button 60 may cause a different signal to be transmitted than when the second button 62 is pressed.

By separating the open/on button 60 from the close/off button 62, the potential of the activated accessory being incorrectly operated is reduced as compared to when only one button is provided for the component activation mechanism 44.

To further reduce uncertainty with respect to correctly operating the wireless controller 10, text and/or graphic may be placed on the two buttons 60, 62. For example, the first button 60 may include the text "OPEN/ON" and the second button 62 may include the text "CLOSE/OFF."

While the words OPEN and ON have different meanings, the meaning of multiple terms placed on one of the buttons may be similar to each other to reduce uncertainty associated with using the wireless controller 10, as could be caused if the button include terms that were significantly different such as OPEN and OFF.

The transmission mechanism 46 enables the wireless controller 10 to communicate with the accessory being controlled. As such, the transmission mechanism 46 communicates in the same protocol as the accessory being controlled. An example of one such suitable communication protocol is radio frequency.

In certain embodiments, the transmission mechanism 46 is capable of transmitting in multiple protocols. It is possible for the communication between the wireless controller 10 and the accessory being controlled to be encrypted or encoded to prevent unauthorized operation of the accessory being controlled.

Depending on the number of accessories that are installed on the truck, trailer, grain cart and/or wagon, it may be possible for the transmission to be directly between the wireless controller 10 and the accessory being controlled. Alternatively or additionally, each of the accessories on the truck, trailer, grain cart and/or wagon may be operably connected using a junction box.

In such situations, the wireless controller 10 may communicate with the junction box. This configuration may reduce the overall cost of the system by eliminating the need for a receiver to be associated with each of the accessories that may be controlled by the wireless controller 10.

The power mechanism 48 provides power to operate the accessories in the wireless controller 10 so that the wireless controller 10 may be operable without continuous connection to an external power source. The power mechanism 48 may include at least one battery. The battery may be permanently or removably mounted in the wireless controller 10.

The permanently mounted battery may be rechargeable while the removably mounted battery may be replaceable when depleted. Alternatively or additionally, the power mechanism 48 may include a solar panel, an electrical cord that plugs into a conventional electrical outlet or cigarette lighter or combination thereof.

The wireless controller 10 may include provisions for recharging the battery without removing the battery from the wireless controller 10. In certain embodiments, the battery may be recharged by connecting the wireless controller 10 to an external power source (not shown). Examples of other techniques that may be used to recharge the battery include a solar panel mounted on a surface of the wireless controller 10.

The circuit assembly 50 is mounted within the base portion 30 and provides for operable interconnection of the components in the wireless controller 10. A person of skill in the art will appreciate that the circuit assembly 50 may take a variety of configurations using the concepts of the invention.

The wireless controller 10 may also include a display mechanism 70 that is operably connected to the other components of the wireless controller 10 such as through the circuit assembly 50, as illustrated in FIG. 4. The display mechanism 70 may take a variety of configurations using the concepts of the invention.

In certain embodiments, the display mechanism 70 may include a video display that, for example, includes a listing of the accessories that may be controlled by the wireless controller 10 and an indicator to indicate the status of the accessories.

In still other embodiments, it is possible for the component selection mechanism 40, the activated component indicator 42, the component activation mechanism 44 and the display mechanism 70 to be combined. For example, the combined system may include a touch screen display that displays the accessories, displays the status of the accessories and allows changing the status of the accessories by pressing particular locations on the touch screen.

In certain embodiments, the wireless controller 10 may include a receiving mechanism 72 that is capable of receiving wireless communication signals from the accessory being controlled, as illustrated in FIG. 4. For example, the receiving mechanism 72 may receive a confirmation that the accessory being controlled received the signal from the transmission mechanism 46.

The receiving mechanism 72 may be capable of communicating in a variety of protocols. An example of one such suitable communication protocol is radio frequency. In certain embodiments, the receiving mechanism 72 may be capable of receiving communication in multiple protocols.

As noted above, it is possible for the communication between the wireless controller 10 and the accessory being controlled to be encrypted or encoded to prevent unauthorized operation of the accessory being controlled.

It is also possible for other details on the operation of the accessory to be transmitted from the accessory to the receiving mechanism 72. An example of one such detail on the operation of the accessory that may be transmitted from the accessory to the receiving mechanism 72 is the location of the accessory such as the hopper door being 50% open.

This location information may be displayed on the wireless controller 10 in a numerical or graphical manner. For example, when the wireless controller 10 includes the display mechanism 70, a graphical representation may be provided to track where the accessory is on the movement between the open configuration and the closed configurations.

In certain embodiments, the wireless controller 10 may include a sound emitting mechanism 74, as illustrated in FIG. 4. For example, the sound emitting mechanism 74 may emit a sound when the transmission mechanism 46 is transmitting. It is also possible for the sound emitting mechanism 74 to emit a sound when the power mechanism 48 is depleted to below a threshold level. It is possible for different sounds to be used to indicate different aspects of the wireless controller 10.

The sound emitting mechanism 74 may also be used to confirm the condition or location of the accessory being controlled. For example, the wireless controller 10 may emit a sound when the trap door reaches the fully closed position so the operator knows the trap door is closed and can release the control button. The sound may be a tone or may be an audible statement such as "trap door closed."

In other embodiments, the wireless controller 10 may include a vibrating mechanism 76, as illustrated in FIG. 4. For example, the vibrating mechanism 76 may vibrate when the transmission mechanism 46 is transmitting. It is possible for different vibrations to be used to indicate different aspects of the wireless controller 10.

The vibrating mechanism 76 may also be used to confirm the condition or location of the accessory being controlled. For example, the wireless controller 10 may vibrate when the trap door reaches the fully closed position so the operator knows the trap door is closed and can release the control button.

Figures 5, 6:
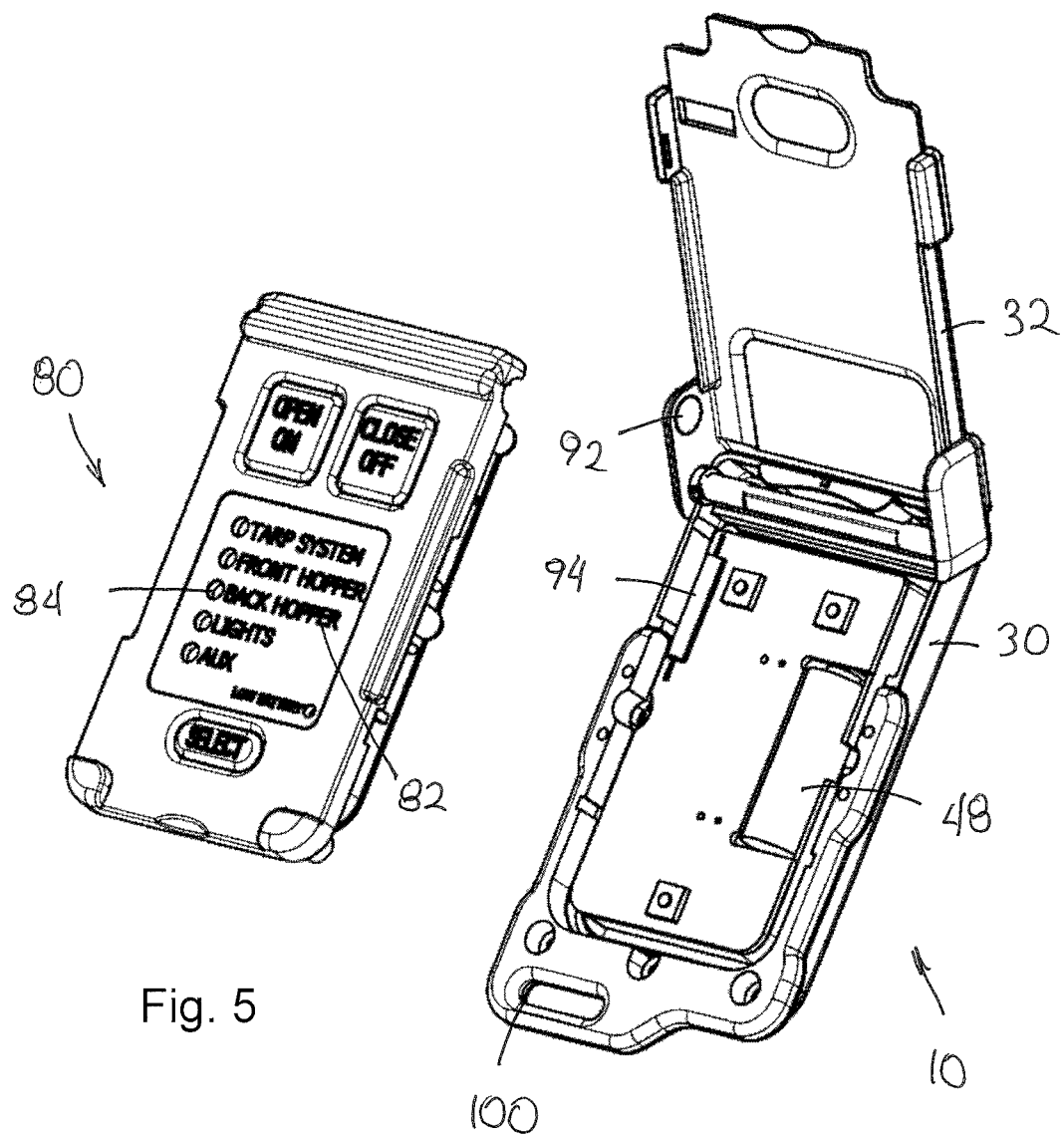
FIG. 5 is a perspective view of a channel identifier overlay for use with the wireless controller.
FIG. 6 is a perspective view of the wireless controller with the channel identifier overlay detached therefrom.

At least one of the components in the wireless controller 10 may be incorporated into a channel identifier overlay 80, which is illustrated in FIGS. 2, 3 and 5. For example, the channel identifier overlay 80 may include text and/or graphic 82 of the components that may be operated using the wireless controller 10.

The channel identifier overlay 80 may also include an aperture 84 formed therein that enables the activated component indicator 42 to be visible from an upper surface of the channel identifier overlay 80. The channel identifier overlay 80 may be formed with a number of apertures 84 that corresponds to the number of accessories that may be operated using the wireless controller 10.

The aperture 84 may be placed adjacent to the text and/or graphic 82 so that the person using the wireless controller 10 will appreciate that when the illuminated light is visible through the aperture 84 signifies that the component identified with the text and/or graphic is activated.

Alternatively or additionally, a portion of the channel identifier overlay 80 may be formed from a transparent material so that the light may be viewed therethrough. It is also possible to fabricate the channel identifier overlay 80 so that the channel identifier overlay 80 is adjacent to the activated component indicator 42. Both of these configurations would enable the light to be viewed by a person using the wireless controller 10 to indicate that the component identified with the text and/or graphic 82 is activated.

The channel identifier overlay 80 may be removably attached to at least one of the base portion 20 and/or the cover portion 22 where the activated component indicator 32 is located. Removably attaching the channel identifier overlay 80 enables the wireless controller 10 to be configured for use with particular systems that have different accessories that are to be controlled by the wireless controller 10.

As an alternative to replacing the entire channel identifier overlay 80, it is possible to replace a decal that is on a surface of the base portion 20 and/or the cover portion 22 where the activated component indicator 32 is located.

The channel identifier overlay 80 may also cover the components that are in the base portion 30. For example, removing the channel identifier overlay 80 may enable the battery to be replaced, as illustrated in FIG. 6. A variety of techniques may be used to attach the channel identifier overlay 80 to the base portion 30 and/or the cover portion 32. An example of one such suitable technique is a plurality of screws.

To reduce the time associated with programming the wireless controller 10, the wireless controller 10 may be marketed with multiple channel identifier overlays 80 that include different accessory configurations. Each of the channel identifier overlays 80 may include an identifying mechanism such that when the particular channel identifier overlay 80 is placed on the base portion 30, the active channels are recognized.

While the figures illustrate that most of the operable components of the wireless controller 10 are included in the base portion 30, it is possible for some of the operable components to also be included in the cover portion 32. For example, the component selection mechanism 40 and the activated component indicator 42 may be placed in the base portion 30 and the component activation mechanism 44 may be placed in the cover portion 32.

To reduce the potential of the cover portion 32 becoming separated from the base portion 30, the cover portion 32 may be operably attached to the base portion 30. In certain configurations, the cover portion 32 may be pivotally mounted to the base portion 30, as illustrated in the figures. In other configurations, the cover portion 32 may be slidably mounted to the base portion 30.

The wireless controller 10 may also include a switch mechanism 90 that is operable based upon the orientation of the cover portion 32 with respect to the cover portion 30, as illustrated in FIG. 2. For example, the switch mechanism 90 may disable the transmission mechanism 46 and/or the receiving mechanism 72 when the cover portion 32 and the base portion 30 are in the closed configuration. This feature would prevent inadvertent activation of the wireless controller 10.

Alternatively or additionally, the switch mechanism 90 may turn off the wireless controller 10 when the cover portion 32 and the base portion 30 are in the closed configuration. This feature would increase the battery life.

In certain embodiments, the wireless controller 10 may be disabled as the cover portion 32 is pivoted towards the base portion 30. For example, the switch mechanism 90 may be activated when the cover portion 32 is oriented with respect to the base portion 30 at an angle of less than about 90 degrees. In other embodiments, the cover portion 32 and the base portion 30 are in the closed configuration when an angle between the cover portion 32 and the base portion 30 is less than about 45 degrees.

This configuration would enable the user to visually verify that the wireless controller 10 is disabled. This configuration also reduces the potential of accidental operation of the wireless controller 10 if a foreign object is accidentally captured between the cover portion 32 and the base portion 30 during the closing process.

In certain embodiments, the switch mechanism 90 includes a magnet 92 and a reed switch 94. The magnet 92 may be mounted on the cover portion 32 and the reed switch 94 may be mounted on the base portion 30. When the cover portion 32 and the base portion 30 are in the closed configuration, the magnet 92 may be proximate the reed switch 94 such that the magnet 92 causes the reed switch 94 to be activated.

Another switch mechanism 90 that may be used in conjunction with the wireless controller 10 is a cam activated switch (not shown). The cam activated switch may include a cam that is located on a pivoting shaft connected to the cover portion 32. The cam activated switch may also include a switch that is positioned within the base portion 30 to be engaged by the cam when the cover portion 32 is moved to a closed configuration. A person of skill in the art will appreciate that other configurations may be used for the switch mechanism that incorporates the concepts of this invention.

A lock mechanism (not shown) may be operably attached to at least one of the base portion 30 and the cover portion 32. The lock mechanism may be used to maintain the wireless controller 10 in the closed configuration. An example of one such lock mechanism is a tab attached to the cover portion 32 that partially extends over the base portion 30 when the wireless controller 10 is in the closed configuration.

Alternatively or additionally, at least one of the base portion 30 and the cover portion 32 may include a detent mechanism that is used to retain the cover portion 32 in a closed configuration with respect to the base portion 30.

To assist a person in operating and/or programming the wireless controller 10, instructions for operating and/or programming the wireless controller 10 may be provided on a surface of at least one of the base portion 30 and the cover portion 32. For example, the instructions may be printed on an inner surface of the cover portion 32 so that the instructions may be viewed when the cover portion 32 is in the open configuration.

The wireless controller 10 may include a holding mechanism 100 to facilitate holding the wireless controller 10. In certain configurations, the holding mechanism 100 may include an aperture formed in at least one of the base portion 30 and the cover portion 32. A strap (not shown) may be extended through the aperture. One such configuration for the strap is a lanyard that may be extended around a person's neck.

In other configurations, a mounting bracket (not shown) may be used in conjunction with the wireless controller 10. The mounting bracket may take a variety of configurations. In one configuration, the mounting bracket is attached to a person's belt or another portion of the person's clothing.

The mounting bracket may also be attached to a portion of a vehicle on which the wireless controller 10 may be used such as in the cab of the truck. The mounting bracket may also operably connect the wireless controller to a power source that may be used to recharge batteries within the wireless controller 10.

In operation, the wireless controller 10 may be configured to turn off when the cover portion 32 is in the closed configuration with respect to the base portion 30. Alternatively or additionally, the wireless controller 10 may also be configured to turn off when the cover portion 32 and the base portion 30 are in the open configuration and the wireless controller 10 is not used for a specified period of time. In certain embodiments, the non-use period may be about 3 minutes.

The wireless controller 10 may be configured to turn on when the cover portion 32 is moved with respect to the base portion 30 to the open configuration. Alternatively or additionally, the wireless controller 10 may be configured to turn on when one of the buttons are depressed.

When the wireless controller 10 is turned on, a light adjacent to the first channel 72 may illuminate to indicate that the wireless controller 10 is turned on. While it is possible to include a separate power indicator on the wireless controller 10 to indicate that the wireless controller 10 is turned on, it is typically desired to maximize the battery life of the wireless controller 10 and, as such, the separate power indicator would consume additional battery power, which could reduce the operation life of the battery. The power indicator could be incorporated into a trademark of the company that manufactures and/or markets the wireless controller 10 or the component being controlled.

When the wireless controller 10 is turned on, the open/on and close/off buttons 60, 62 may be used to control the operation of the accessory that is associated with the first channel 64. When it is desired to control the operation of other accessories, the component selection mechanism 40 may be pressed to illuminate the light adjacent to one of the other channels 64.

As set forth above, the wireless controller 10 may include the ability to selectively activate or deactivate the ability to control particular features or accessories by entering the programming mode. To prevent the accessories from being inadvertently turned on or off, the transmission mechanism 46 may be turned off when the wireless controller 10 is in the programming mode.

At least one of the buttons 40, 60, 62 may be used to enter in programming mode. In certain embodiments, the button 40 is pressed for a period of time that is longer than the button 40 is pressed during typical operation. For example, the button 40 may be depressed for at least about 10 seconds.

Alternatively, pressing the buttons 40, 60, 62 in a selected order or simultaneously pressing more than one of the buttons 40, 60, 62 may be used to enter the programming mode. In still other embodiments, a separate button is provided for entering the programming mode.

The process for entering the programming mode may be not told to the person who is typically using the wireless controller 10 to prevent the person from changing the configuration of the wireless controller 10.

When the wireless controller 10 is in the programming mode, the operational features of the wireless controller 10 may be changed. For example, the programming mode may be used to activate or deactivate controls for particular accessories that are desired to be controlled by the wireless controller 10. By deactivating the controls for the accessories that are not in use, the wireless controller 10 may be operated more quickly because the operator will not have to scroll through channels that are not active.

Each time the wireless controller 10 enters the programming mode, the activation status of each of the channels may be reset to a default configuration. In certain embodiments, the default configuration is that the channel is deactivated. If a cycle of the programming mode is completed and at least one of the channels is not activated, the wireless controller 10 may revert back to a previously saved configuration.

When in the programming mode, pressing the open/on button 60 may cause the selected channel to be activated and pressing the close/off button 62 may cause the selected channel to be deactivated. After either the open/on button 60 or the close/off button 62 is pressed, the indicator light adjacent to the next channel may be illuminated to indicate that the next channel is ready to be programmed. This process may be repeated until all of the channels have been programmed.

If it is desired to cancel the changes being made while the wireless controller 10 is in the programming mode, the programming mode may be canceled by moving the cover portion 32 to the closed configuration with respect to the base portion 30 or otherwise turning off the wireless controller 10.

After all of the channels have been programmed, the status of all of the channels may be displayed. For example, the status may be displayed for about 3 seconds. Those channels that are activated may be indicated by an illuminated light adjacent to the channel designator and those channels that are deactivated will be indicated by a non-illuminated light adjacent to the channel designator.

The buttons 40, 60, 62 and the transmission mechanism 46 may be disabled during the confirmation period. After the confirmation period is completed, the wireless controller 10 may return to the operational mode during which the accessories may be controlled.

Depending on the manner in which the wireless controller 10 is sold, it may be necessary for the wireless controller 10 and a receiver on the accessory to be programmed to recognize each other. For example, if the wireless controller 10 and the accessory are sold separately, the wireless controller 10 may not be configured to communicate with the receiver on the accessory during the manufacturing process. In this situation, the wireless controller 10 will need to be programmed to communicate with the receiver on the accessory.

In certain embodiments, the receiver on the accessory may include a learn button. The learn button may be activated such as by pressing the learn button for more than a selected period of time. While the receiver is in the learn mode, the select button 40 is pressed until the light adjacent to the channel that is desired to be programmed is illuminated. Thereafter, the open/on button 60 may be pressed for a selected number of times such as five to cause the receiver to be recognized by the wireless controller 10. The light adjacent to the programmed channel may flash to indicate that the programming process was successful.

The wireless controller 10 may then be tested to confirm that the programming was successful. It is possible to program additional channels on the wireless controller 10 using the preceding process so that the wireless controller 10 becomes associated with additional components. Examples of components that may be programmed to work with the wireless controller 10 include tarp systems, hoppers, landing gear and lights.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A product transportation system comprising:
   a vehicle capable of having at least two electrically operable accessories associated therewith, the vehicle having a first said electrically operable accessory comprising a rolling tarp system for selectively covering a hopper associated with the vehicle, the rolling tarp system being movable between an unrolled configuration substantially covering the hopper and a rolled configuration uncovering the hopper; and
   a wireless controller configured to control at least two electrically operable accessories, the wireless controller controlling the rolling tarp system of the first electrically operable accessory, the wireless controller comprising:
      a cover portion;
      a base portion operably attached to the cover portion;
      a transmission mechanism mounted to at least one of the cover portion and the base portion;
      a visually-perceptible listing of identifiers for each of the at least two electrically operable accessories, the listing being located on at least one of the cover portion and the base portion;
      a single component selection mechanism comprising a depressible button mounted to at least one of the cover portion and the base portion, wherein the component selection mechanism is capable of selecting one of the electrically operable accessories including the rolling tarp system;
      an activated component indicator, wherein the activated component indicator indicates the electrically operable accessory selected by the component selection mechanism; and
      a component activation mechanism mounted to at least one of the cover portion and the base portion, wherein actuation of the component activation mechanism causes the transmission mechanism to transmit a communication signal to the selected electrically operable accessory to operate the selected electrically operable accessory, wherein when the rolling tarp system is the selected electrically operable accessory, the communication signal includes at least one of a signal to move the rolling tarp system to the unrolled condition and a signal to move the rolling tarp system to the rolled condition;
      wherein when the cover portion and the base portion are positioned in a closed configuration, the component activation mechanism is substantially covered in a manner such that the component activation mechanism is not actuatable by contact with the mechanism to reduce a potential of inadvertent actuation of the component activation mechanism and activation of the rolling tarp system by the wireless controller; and
   wherein the component selection mechanism is configured such that depression of the depressible button of the component selection mechanism toggles the selected one of the electrically operable accessories between a series of the at least two electrically operable accessories, with each depression of the button changing the selected one of the electrically operable components to another one of the electrically operable components to be operated by actuation of the component activation mechanism.

2. A wireless controller for operably controlling at least two devices, wherein one device of the at least two devices includes a rolling tarp system for selectively covering a hopper associated with the vehicle, the rolling tarp system being movable between an unrolled configuration substantially covering the hopper and a rolled configuration uncovering the hopper, the wireless controller comprising:
   a cover portion;
   a base portion operably attached to the cover portion;
   a transmission mechanism mounted to at least one of the cover portion and the base portion;
   a visually-perceptible listing of identifiers for each of the at least two electrically operable accessories, the listing being located on at least one of the cover portion and the base portion;
   a single component selection mechanism comprising a depressible button mounted to at least one of the cover portion and the base portion, wherein the component selection mechanism is capable of selecting one of the electrically operable accessories including the rolling tarp system;
   an activated component indicator, wherein the activated component indicator indicates the electrically operable accessory selected by the component selection mechanism; and
   a component activation mechanism mounted to at least one of the cover portion and the base portion, wherein actuation of the component activation mechanism causes the transmission mechanism to transmit a communication signal to the selected electrically operable accessory to operate the selected electrically operable accessory, wherein when the rolling tarp system is the selected electrically operable accessory, the communication signal includes at least one of a signal to move the rolling tarp system to the unrolled condition and a signal to move the rolling tarp system to the rolled condition;

wherein when the cover portion and the base portion are positioned in a closed configuration, the component activation mechanism is substantially covered in a manner such that the component activation mechanism is not actuatable by contact with the mechanism to reduce a potential of inadvertent actuation of the component activation mechanism and activation of the rolling tarp system by the wireless controller; and wherein the component selection mechanism is configured such that depression of the depressible button of the component selection mechanism toggles the selected one of the electrically operable accessories between a series of the at least two electrically operable accessories, with each depression of the button changing the selected one of the electrically operable components to another one of the electrically operable components to be operated by actuation of the component activation mechanism.

\* \* \* \* \*